No. 708,772. Patented Sept. 9, 1902.
C. F. LAUDERDALE.
DENTAL GOLD ANNEALER.
(Application filed Sept. 23, 1901.)
(No Model.)
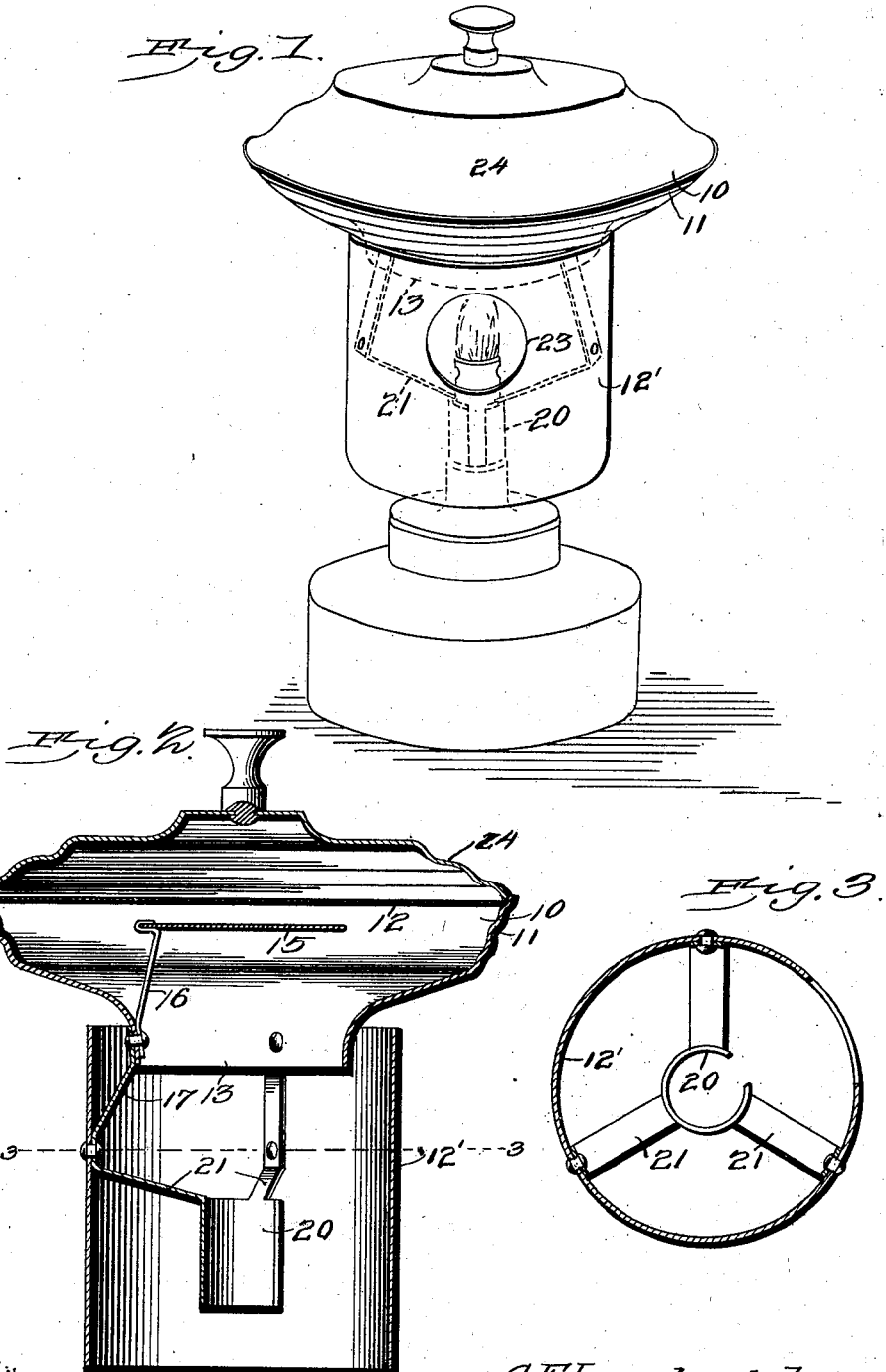

UNITED STATES PATENT OFFICE.

CHAPIN F. LAUDERDALE, OF MILWAUKEE, WISCONSIN.

DENTAL-GOLD ANNEALER.

SPECIFICATION forming part of Letters Patent No. 708,772, dated September 9, 1902.

Application filed September 23, 1901. Serial No. 76,167. (No model.)

*To all whom it may concern:*

Be it known that I, CHAPIN F. LAUDERDALE, a citizen of the United States, residing in the city of Milwaukee, in the county of Milwaukee, in the State of Wisconsin, have invented a new and useful Dental-Gold Annealer, of which the following is a specification.

My invention relates to certain improvements in heating and annealing devices for dentists' use, and has for its principal object to provide an improved apparatus for annealing the forms of gold used by dentists as a filling for the teeth and to devise a mechanism which may be attached to any of the ordinary forms of dental lamps or burners.

Further objects of the invention are to so construct and arrange the device as to equalize and distribute the heat to the annealing-plate, to provide a suitable draft-shield for the flame, and to provide an improved form of holding-clip for engagement with the lamp-burner.

With these and other objects in view the invention consists in the novel construction and arrangement of parts hereinafter described, illustrated in the accompanying drawings, and particularly pointed out in the appended claims.

In the drawings, Figure 1 is a perspective view of an annealing and heating device constructed in accordance with my invention, illustrating the same in position on a dental lamp of ordinary construction. Fig. 2 is a sectional elevation of the attachment. Fig. 3 is a sectional plan view of the same on the line 3 3 of Fig. 2.

Similar numerals of reference are employed to indicate corresponding parts throughout the several figures of the drawings.

Referring to the drawings, 10 designates a cup or bowl open at top and bottom and having a beaded rim 11 for the reception and support of an annealing-plate 12, on which the gold to be annealed is placed. The lower neck portion of the cup or bowl extends for a slight distance within the upper end of a cylindrical guard 12, formed of sheet metal of suitable thickness and serving to protect the lamp-flame from drafts and to conserve and direct the products of combustion into the cup or bowl 10 and in contact with the annealing-plate 12 therein, a portion of the products of combustion passing out between the cylinder and the neck 13 into contact with the lower surface of the cup or bowl 10 and serving to retain the heat within the latter. In order to equally distribute the heat to the annealing-plate and to prevent the flame from impinging directly on the central portion of said plate, I provide a guard or shield 15, preferably in the form of a disk arranged centrally below the annealing-plate, but out of contact therewith, said disk being carried by an edge clip 16, secured or formed integral with a supporting-arm 17, which is riveted or otherwise secured within the lower portion of the neck 13.

In the drawings is illustrated an ordinary form of dental lamp to which it is proposed to attach the annealing device, and as a means of support I employ a spring-clip 20, preferably in the form of a split ring or tube adapted to embrace the cylindrical or tapering burner of the lamp, said tube or ring being provided with a plurality of integral arms 21, which are bent outwardly and secured by rivets or other suitable means to the flame-guard and are thence bent inwardly and upwardly and riveted or otherwise secured to the depending neck 13 of the cup or bowl 10. In this manner all of the parts are held in proper relative position and may readily be placed on the burner of a lamp when desired. For convenience in lighting the lamp an opening, as 23, is formed in one side of the flame-shield at a point in alinement with the wick.

In order to protect the annealing-plate, I provide a suitable cap or cover 24, which fits within the rim of the bowl or cup 10, as shown in Fig. 1.

The device as described may be used for a variety of purposes, but is principally intended for the purpose of annealing the gold employed to fill cavities in teeth, for heating gutta-percha, and similar operations which must be carried on in the presence of patients and without loss of time or inconvenience to the operator.

While the construction herein described, and illustrated in the accompanying drawings, is the preferred form of the device, it is obvious that various changes in the form, proportions, size, and minor details of the structure may be made without departing from the spirit or sacrificing any of the advantages of my invention.

Having thus described my invention, what I claim is—

1. An annealing or heating attachment for dental lamps, comprising a bowl having an open-bottom portion and provided with an annealing-plate, a flame-shield arranged below said annealing-plate, a burner socket or clip, and means for connecting the same to said bowl.

2. An annealing or heating attachment for dental lamps, comprising a bowl having an annealing-plate and terminating in a contracted neck, a flame-guard arranged below said bowl, a burner socket or clip, and means for connecting the socket or clip to the flame-guard and the bowl.

3. An annealing or heating attachment for dental lamps, comprising a bowl having a lower neck portion, an annealing-plate carried by said bowl, a shield or guard arranged within the bowl at a point below the annealing-plate, a cylindrical flame-guard disposed below said bowl, a burner socket or clip, and means for connecting the same to the cylindrical flame-guard and the bowl.

4. An annealing or heating attachment for dental lamps, comprising a bowl having a lower neck portion, an annealing-plate carried by the bowl, a guard or shield arranged within the bowl at a point below the annealing-plate, a carrying-clip for said shield, a cylindrical flame-guard arranged below and surrounding the neck portion of the bowl, and a spring ring or socket having integral arms bent outwardly and upwardly and secured to the cylindrical guard and to the neck portion of the bowl.

In testimony that I claim the foregoing as my own I have hereto affixed my signature in the presence of two witnesses.

CHAPIN F. LAUDERDALE.

Witnesses:
A. E. LAUDERDALE,
M. HUFFMAN.